(12) United States Patent
Chou

(10) Patent No.: US 9,371,105 B2
(45) Date of Patent: Jun. 21, 2016

(54) FRAME STRUCTURE FOR BICYCLE

(71) Applicant: GIANT (KUNSHAN) CO., LTD., Jiang Su (CN)

(72) Inventor: Ming-En Chou, Taichung (TW)

(73) Assignee: GIANT (KUNSHAN) CO., LTD., Jiang Su (CN)

( * ) Notice: Subject to any disclaimer, the term of this patent is extended or adjusted under 35 U.S.C. 154(b) by 0 days.

(21) Appl. No.: 14/729,033

(22) Filed: Jun. 2, 2015

(65) Prior Publication Data

US 2016/0083037 A1  Mar. 24, 2016

(30) Foreign Application Priority Data

Sep. 23, 2014  (CN) ...................... 2014 2 0550210 U

(51) Int. Cl.
*B62K 3/02* (2006.01)
*B62K 3/04* (2006.01)
*B62K 19/06* (2006.01)

(52) U.S. Cl.
CPC ... *B62K 3/02* (2013.01); *B62K 3/04* (2013.01); *B62K 19/06* (2013.01); *B62K 2700/34* (2013.01); *B62K 2700/36* (2013.01); *B62K 2700/38* (2013.01)

(58) Field of Classification Search
CPC ............ B62K 5/06; B62K 7/02; B62K 11/06; B62K 3/00; B62K 9/00
See application file for complete search history.

(56) References Cited

U.S. PATENT DOCUMENTS

| | | | | |
|---|---|---|---|---|
| 602,162 A | * | 4/1898 | Kellogg | B62M 1/26 |
| | | | | 174/DIG. 2 |
| 1,083,115 A | * | 12/1913 | Mallory | B60F 3/0038 |
| | | | | 440/12.62 |
| D100,203 S | * | 6/1936 | Clements | D12/111 |
| D146,436 S | * | 3/1947 | Taylor | D12/111 |
| D146,437 S | * | 3/1947 | Taylor | D12/111 |
| 3,030,124 A | * | 4/1962 | Holloway | B62K 3/02 |
| | | | | 156/293 |
| D193,462 S | * | 8/1962 | Silbereis | D12/109 |
| 3,226,132 A | * | 12/1965 | Otani | B62J 7/02 |
| | | | | 280/281.1 |
| 3,237,961 A | * | 3/1966 | McMullen | B62K 5/06 |
| | | | | 267/275 |
| 3,259,399 A | * | 7/1966 | Silbereis | B62J 7/00 |
| | | | | 280/287 |
| D206,741 S | * | 1/1967 | Ross | D12/111 |
| D213,606 S | * | 3/1969 | Gordon et al. | D12/111 |
| 3,945,667 A | * | 3/1976 | Cipres | B62K 3/02 |
| | | | | 280/261 |
| 4,440,414 A | * | 4/1984 | Wang | B62K 15/008 |
| | | | | 280/278 |

(Continued)

*Primary Examiner* — Joseph Rocca
*Assistant Examiner* — Gabriela C Craciun
(74) *Attorney, Agent, or Firm* — CKC & Partners Co., Ltd.

(57) ABSTRACT

A frame structure for a bicycle includes a head tube, a support tube assembly and a seat tube. The support tube assembly connects the head tube and the seat tube and includes two top tubes, one down tube and two reinforced tubes.

14 Claims, 7 Drawing Sheets

(56) References Cited

U.S. PATENT DOCUMENTS

| | | | | |
|---|---|---|---|---|
| D301,130 S | * | 5/1989 | Brummer | D12/111 |
| 4,995,626 A | * | 2/1991 | Montague | B62K 15/008 |
| | | | | 280/231 |
| D335,640 S | * | 5/1993 | Gasiorowski | D12/111 |
| 5,290,053 A | * | 3/1994 | Barts | B62K 3/02 |
| | | | | 280/281.1 |
| 5,611,555 A | * | 3/1997 | Vidal | B60G 3/14 |
| | | | | 180/215 |
| 5,762,351 A | * | 6/1998 | SooHoo | B60G 21/007 |
| | | | | 180/210 |
| 5,794,958 A | * | 8/1998 | Hsiao | B62K 15/006 |
| | | | | 280/278 |
| 6,012,733 A | * | 1/2000 | Rafoth | B62K 3/00 |
| | | | | 280/281.1 |
| 6,139,038 A | * | 10/2000 | Santa Cruz | B62K 3/10 |
| | | | | 280/274 |
| D445,364 S | * | 7/2001 | Litke | D12/111 |
| 6,290,017 B1 | * | 9/2001 | Ito | B62K 11/06 |
| | | | | 180/219 |
| 6,474,667 B1 | * | 11/2002 | Stocksmeier | B62J 15/00 |
| | | | | 280/200 |
| D533,811 S | * | 12/2006 | Hoisington | D12/111 |
| D619,935 S | * | 7/2010 | Lee | D12/111 |
| D633,826 S | * | 3/2011 | Morrow | D12/111 |
| D637,527 S | * | 5/2011 | Choi | D12/111 |
| 8,382,135 B1 | * | 2/2013 | Raike, III | B62M 29/00 |
| | | | | 152/209.11 |
| 8,465,039 B2 | * | 6/2013 | Duvivier | B62K 3/02 |
| | | | | 280/261 |
| D688,599 S | * | 8/2013 | Silva | D12/111 |
| D720,657 S | * | 1/2015 | Kahler, Jr. | D12/111 |
| D721,014 S | * | 1/2015 | Kahler, Jr. | D12/111 |
| D722,285 S | * | 2/2015 | Silva | D12/111 |
| D738,261 S | * | 9/2015 | Silva | D12/111 |
| 2008/0238031 A1 | * | 10/2008 | Tseng | B62K 3/02 |
| | | | | 280/284 |
| 2008/0283320 A1 | * | 11/2008 | Bowles | A61G 5/047 |
| | | | | 180/210 |
| 2009/0236820 A1 | * | 9/2009 | Chang | B62K 5/027 |
| | | | | 280/283 |
| 2011/0115191 A1 | * | 5/2011 | VanLoozen | B62K 3/02 |
| | | | | 280/274 |
| 2013/0193668 A1 | * | 8/2013 | Decker | B62K 5/06 |
| | | | | 280/261 |
| 2014/0197616 A1 | * | 7/2014 | Raike, III | B62K 17/00 |
| | | | | 280/259 |

* cited by examiner

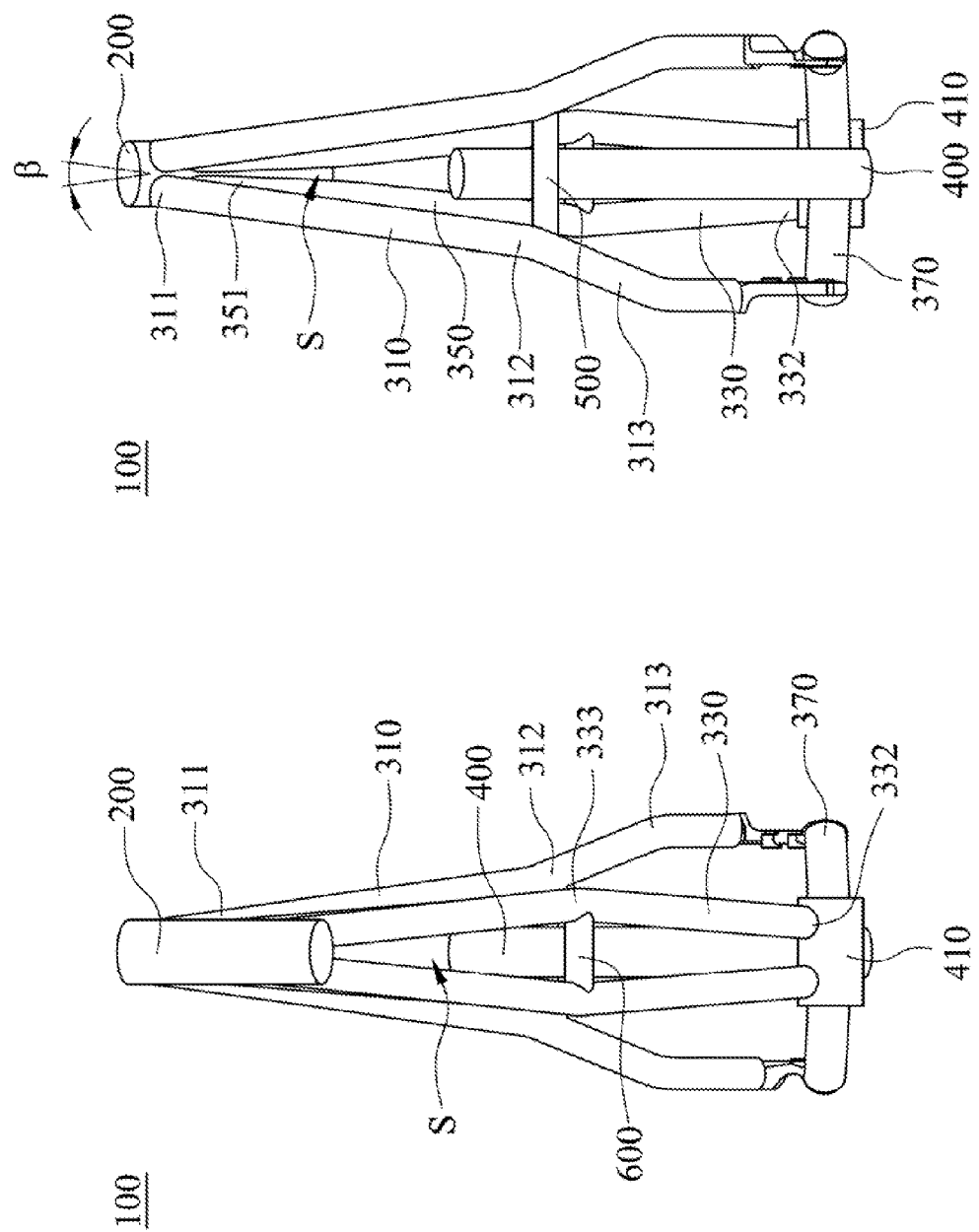

FRAME STRUCTURE FOR BICYCLE

This application claims priority to China Application Serial Number 201420550210.3, filed Sep. 23, 2014, which is herein incorporated by reference.

BACKGROUND

1. Technical Field

The present disclosure relates to a frame structure. More particularly, the present disclosure relates to a frame structure for bicycle.

2. Description of Related Art

With the fast pace of life for people nowadays, it is a general consensus to exercise regularly so that making the body and mind to equilibrium, such as bicycle, freewheel and stationary bike that can be operated without complicated techniques. As a convenience that people can ride a bicycle everywhere by themselves, the similar sports are especially popular with metropolitan residents. Correspondingly, the frame structure applied on bicycles is evolved a high-tech product which is light, smooth and tough.

In order to lighten the bicycle, the designer usually uses tubes with bigger size or simplifies the frame structure. However, even this way could achieve the goal aforementioned, it is clear the frame structure will be weaken so may easy to break. Excepting the above disadvantage which causes difficulties and high cost when manufacturing and limits the type or size of parts applied on a frame structure, another one is that the rigidity of the frame structure isn't enough to carry the load so that to improve the efficiency on riding. Hence, even the frame structure is lightweight, it's sure that such product may pose a risk to safety.

Another common frame structure for bicycle uses a design that separates the seat tube partly from the frame structure in order to make a feeling like to float in the air when riding a bicycle. With structure of the design, the number or the size could be reduced as possible owing to the elasticity which could reduce the vibration, however, the materials for the frame are demanding and costly for the reason these materials are suppose to be tough for deforming repeatedly without fatigue or creep. Accordingly, its usually difficult to maintain the balance and stability of a bicycle. Therefore, the research field to frame structure for bicycle is focused on strength, balance and smooth on the condition that the structure is satisfied with economy and comfort.

SUMMARY

According to an embodiment of the present disclosure, a frame structure for bicycle includes a head tube, a support tube assembly and a seat tube. The support tube assembly includes two top tubes, at least one down tube and two reinforced tubes. One end of each of the top tubes, one end of the down tube and one end of each of the reinforced tubes are fixedly connected to the head tube. Each of the reinforced tubes has a bended portion fixedly connected with the down tube. The seat tube is fixedly connected with the other end of each of the top tubes, the other end of the down tube and the other end of each of the reinforced tubes.

According to another embodiment of the present disclosure, a frame structure for bicycle includes a head tube, two top tubes, two down tubes, two reinforced tubes, a seat tube and an intermediary tube. One end of each of the top tubes, one end of each of the down tubes and one end of each of the reinforced tubes are fixedly connected to the head tube. Each of the reinforced tubes has a bended portion fixedly connected with the corresponding down tube. The seat tube is fixedly connected with the other end of each of the top tubes, the other end of each of the down tubes and the other end of each of the reinforced tubes. The intermediary tube is fixedly connected with the two middle portions of the down tubes.

BRIEF DESCRIPTION OF THE DRAWINGS

The present disclosure can be more fully understood by reading the following detailed description of the embodiment, with reference made to the accompanying drawings as follows:

FIG. 4 shows a front side view of the frame structure for bicycle of FIG. 1;

FIG. 5 shows a rear side view of the frame structure for bicycle of FIG. 1;

DETAILED DESCRIPTION

Figure 1:
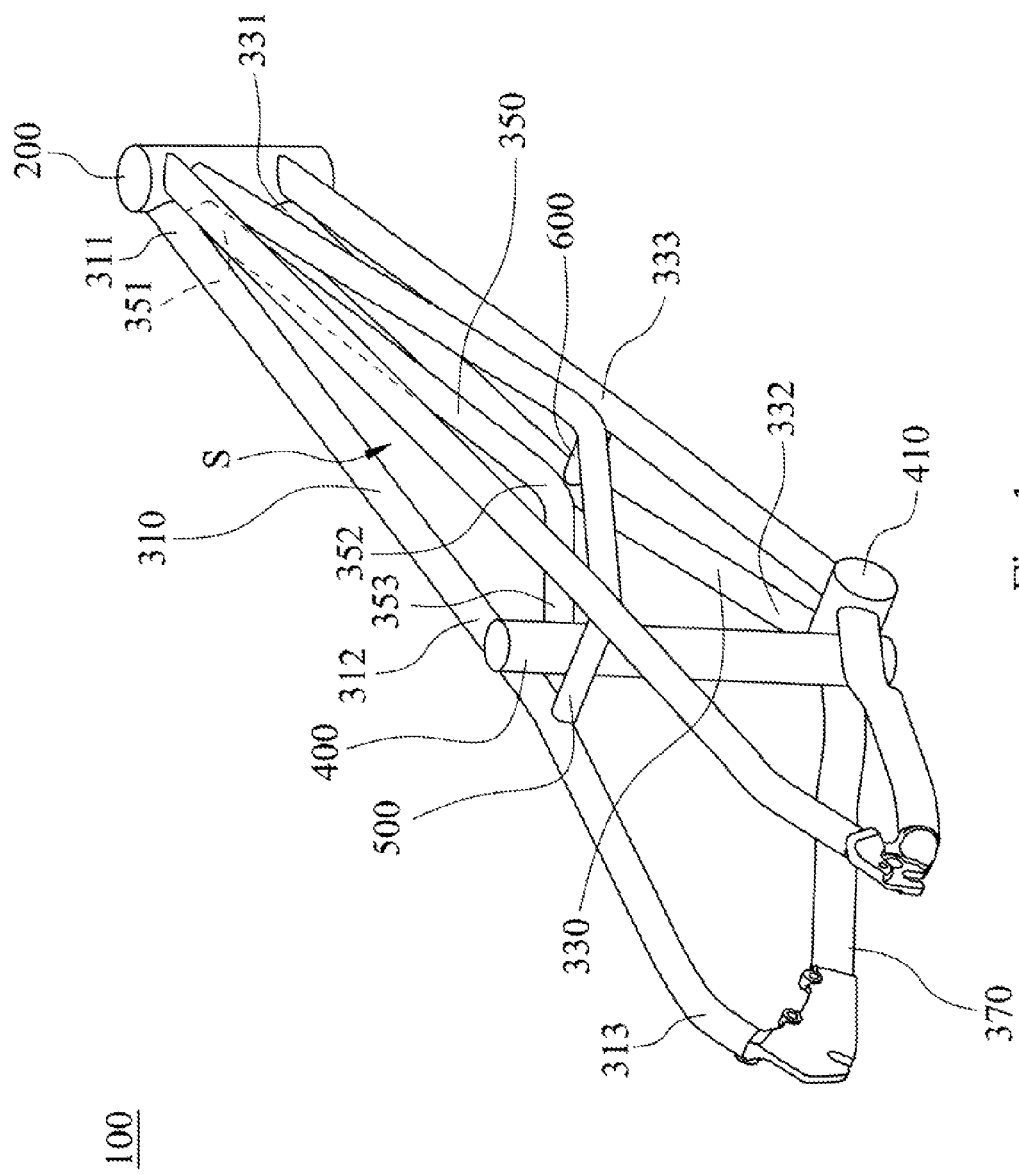
FIG. 1 shows a three dimensional view of a frame structure for a bicycle according to one embodiment of the present disclosure.
Figure 2:
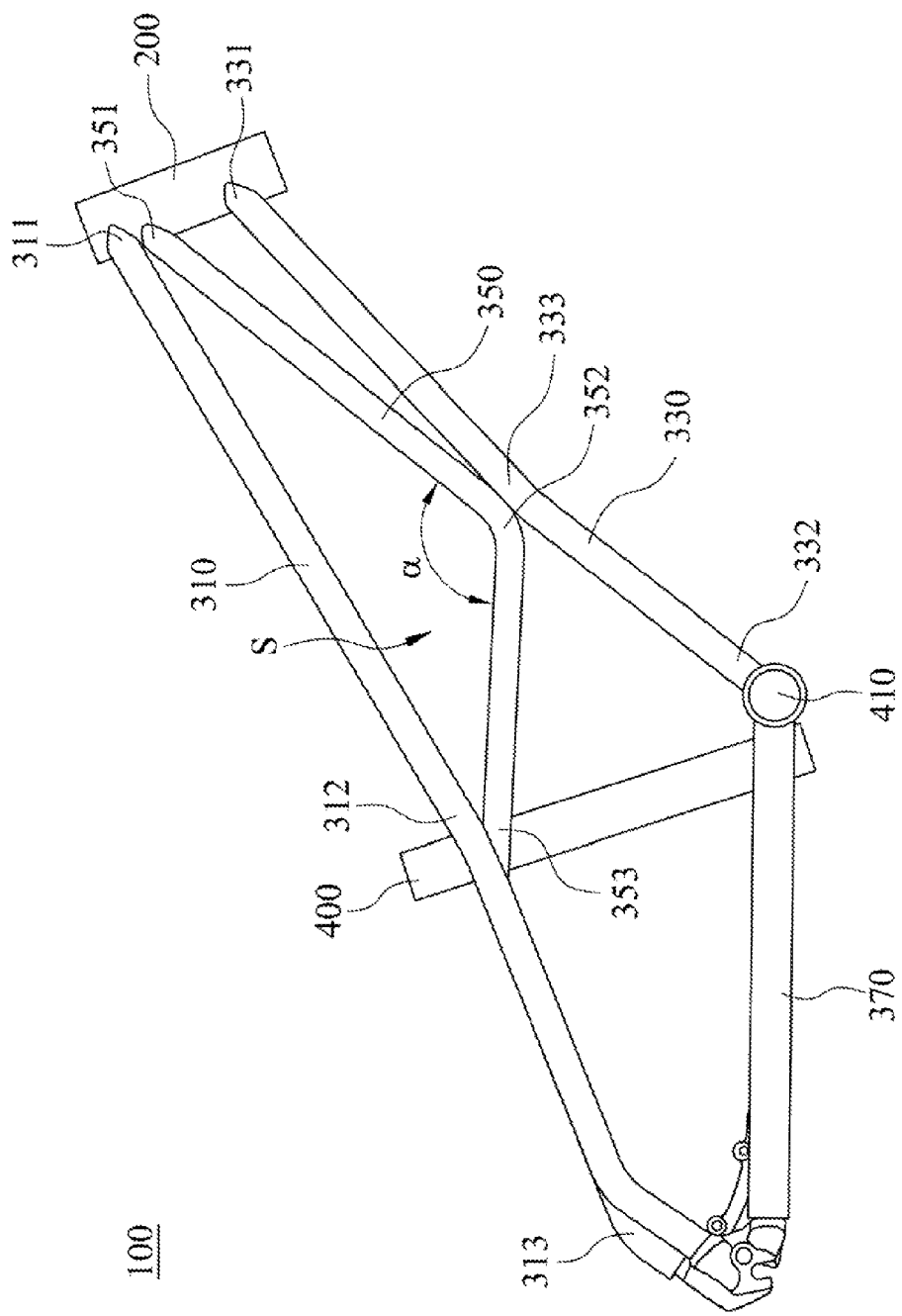
FIG. 2 shows a right side view of the frame structure for bicycle of FIG. 1.

FIG. 1 shows a three dimensional view of a frame structure for a bicycle 100 according to one embodiment of the present disclosure. FIG. 2 shows a right side view of the frame structure for bicycle 100 of FIG. 1. In FIG. 1 and FIG. 2, the frame structure for bicycle 100 includes a head tube 200, a support tube assembly (not labeled) and a seat tube 400. The head tube 200 is positioned at the front end of the frame structure for bicycle 100. The support tube assembly includes two top tubes 310, two down tubes 330 and two reinforced tubes 350, wherein the two top tubes 310, the two down tubes 330, and the two reinforced tubes 350 are respectively in pairs and symmetric, and only one of the top tubes 310, one of the down tubes 330 and one of the reinforced tubes 350 are labeled. In detail, one end 311 of each of the two top tubes 310, one end 331 of each of the two down tubes 330 and one end 351 of each of the two reinforced tubes 350 are fixedly connected to the head tube 200. As shown in FIG. 1 and FIG. 2, the two reinforced tubes 350 are disposed between the two top tubes 310 and the two down tubes 330. Moreover, each of the two reinforced tubes 350 has a bended portion 352, wherein the bended portions 352 are fixedly connected with middle portions 333 of the two down tubes 330, respectively. To ensure the force applied on the two down tubes 330 are proper, a bended angle α at the bended portions 352 can be greater than 90° and smaller than 150°.

The seat tube 400 is corresponded to the head tube 200. The upper half of the seat tube 400 is connected with the other end 312 of each of the top tubes 310 and the other end 353 of each of the two reinforced tubes 350, and the bottom half of the seat tube 400 is connected with the other end 332 of each of the two down tubes 330. Moreover, the frame structure for bicycle 100 can further include a transitive tube 500 which is fixedly disposed on one side of the seat tube 400 so that the other end 312 of each of the top tubes 310 and the other end 353 of each of the two reinforced tubes 350 can be disposed on both sides of the seat tube 400 via the transitive tube 500. The bottom of the seat tube 400 can be a bottom bracket shell 410 available for fixedly connecting the other ends 332 and the seat tube 400.

Figure 3:
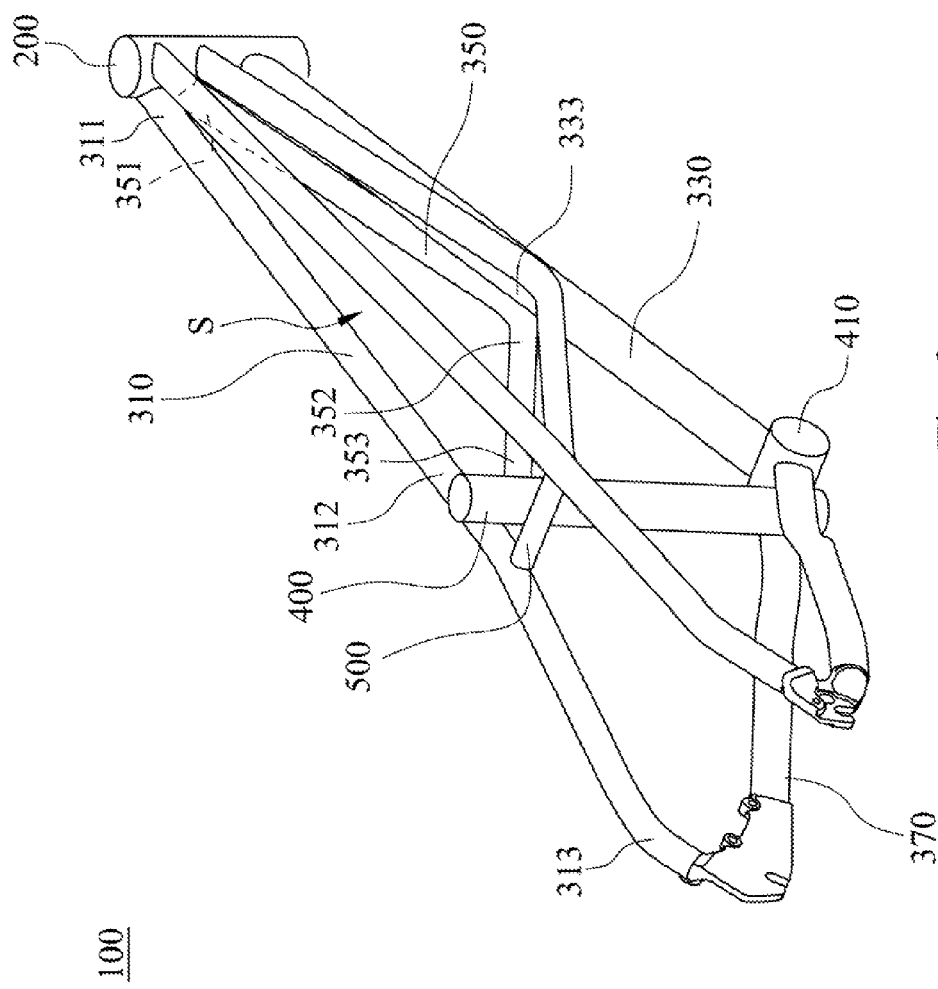
FIG. 3 shows a three dimensional view of a frame structure for bicycle according to another embodiment of the present disclosure.

FIG. 3 shows a three dimensional view of a frame structure for bicycle 100 according to another embodiment of the present disclosure. As shown in FIG. 3, the support tube assembly (not labeled) of the frame structure for bicycle 100 includes one down tube 330, and the bended portions 352 of the reinforced tubes 350 are connected with the down tubes 330.

Moreover, the ends 351 can be connected with the ends 311 to form an inner space S being a triangular prism, that is, the inner space S has several triangular structures created between the head tube 200 and the seat tube 400. Therefore, the stress can be transmitted efficiently by the triangular structures and the materials for manufacturing or assembling the support tube assembly can be saved for lightening the bicycle further.

FIG. 4 shows a front side view of the frame structure for bicycle 100 of FIG. 1. The frame structure for bicycle 100 can further include an intermediary tube 600 fixedly connected with the two middle portions of the down tubes, so that the down tubes can be further positioned. With the connection, the slenderness ratio can be lowered for avoiding the deformation of the down tubes 330 caused by a long-term application of the external force. To strengthen the support tube assembly, the intermediary tube 600 can also be connected to the bended portions 352 of the reinforced tubes 350, so that each tube of the support tube assembly would not be deformed unexpectedly in transverse direction.

FIG. 5 shows a rear side view of the frame structure for bicycle 100 of FIG. 1. In FIG. 5, the frame structure for bicycle 100 can further include two seat stays 313 and two chain stays 370, wherein the two seat stays 313 are symmetric to each other and extend from the top tubes 310. As shown in FIG. 5, an exterior angle β is between the two top tubes 310, wherein the exterior angle β can be greater than 15° and smaller than 45°. Therefore, the stress transmitted property can be obtained. Further, the chain stays 370 can be connected to the seat tube 400 directly or via the bottom bracket shell 410.

Figure 6:
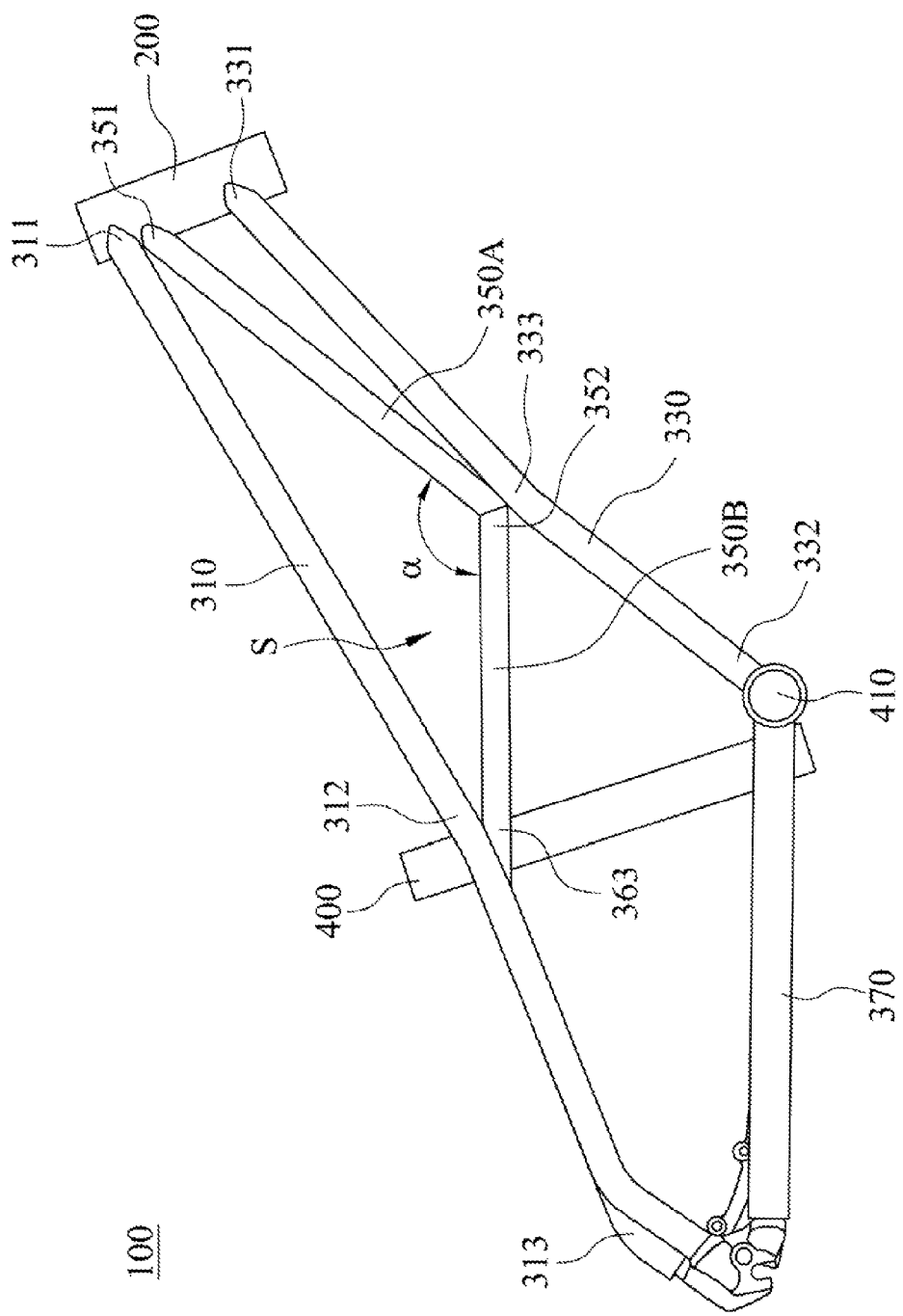
FIG. 6 shows a right side view of the frame structure for bicycle according to yet another embodiment of the present disclosure.
Figure 7:
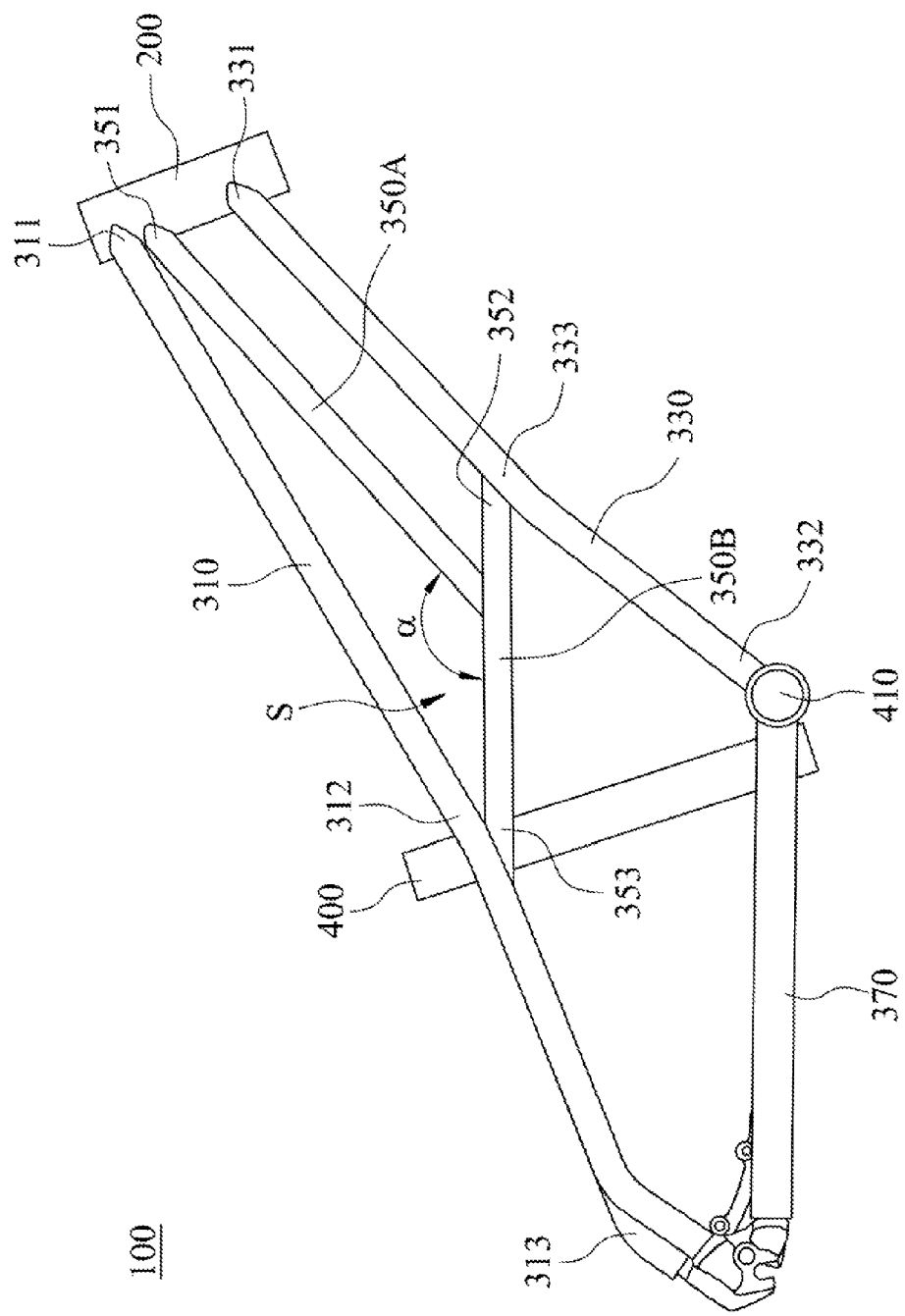
FIG. 7 shows a right side view of the frame structure for bicycle according to further another embodiment of the present disclosure.

FIG. 6 shows a right side view of the frame structure for bicycle 100 according to yet another embodiment of the present disclosure. FIG. 7 shows a right side view of the frame structure for bicycle 100 according to further another embodiment of the present disclosure. In FIG. 6 and FIG. 7, each of the reinforced tubes 350 can include two combinative tubes 350A and 350B. In FIG. 6, one end of the combinative tube 350A and one end of the combinative tube 350B are connected to each other for forming the bended portion 352. In FIG. 7, one end of the combinative tube 350A is connected to the side of the combinative tube 350B for forming the bended portion 352. According to the two embodiments in FIGS. 6 and 7, the bended angle α at the bended portion 352 is greater than 90° and smaller than 150° m. Moreover, each of the reinforced tubes 350 can be fixedly connected with the down tube 330 no matter the number of the down tube 330 in the mentioned embodiments is one or two.

Figure 8:
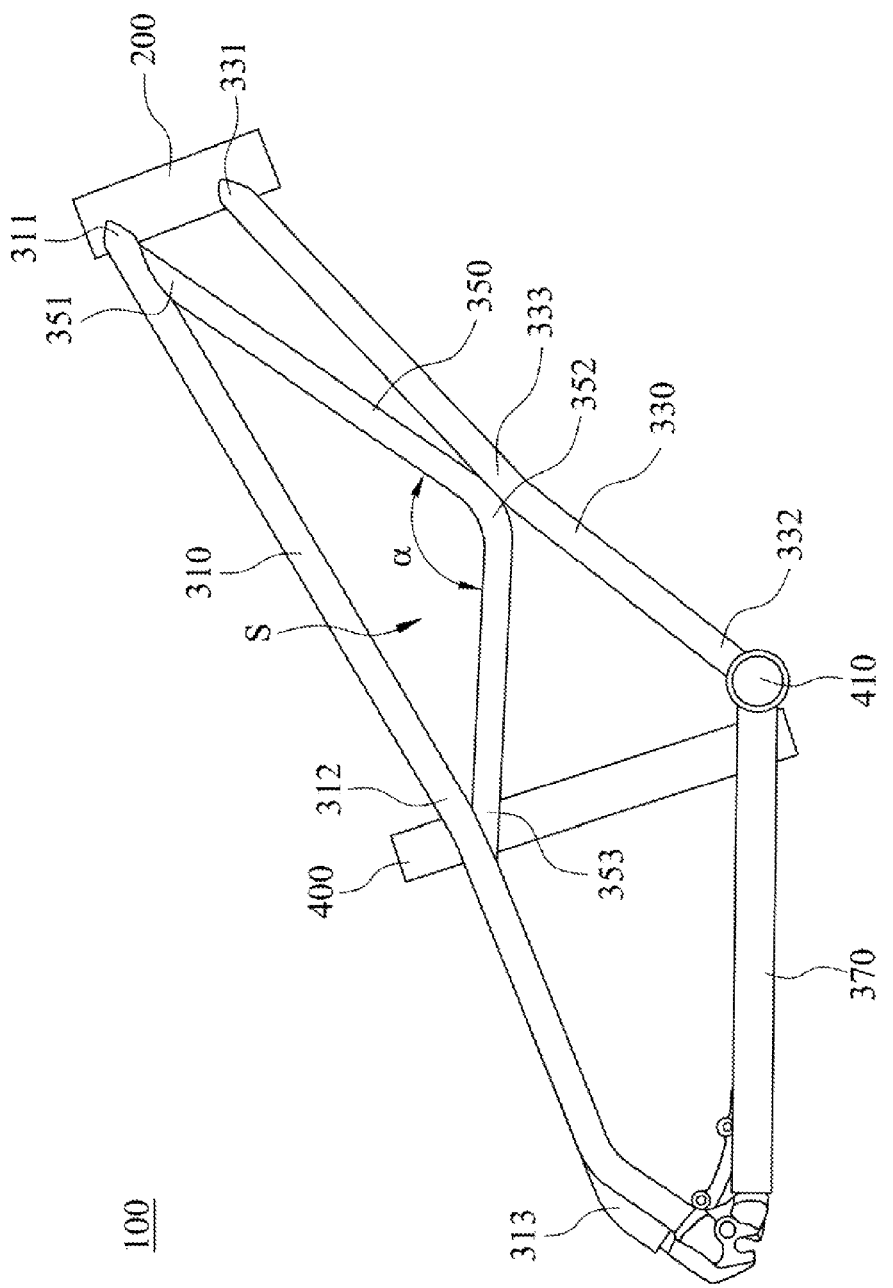
FIG. 8 shows a right side view of the frame structure for bicycle according to further another embodiment of the present disclosure.

FIG. 8 shows a right side view of the frame structure for bicycle 100 according to further another embodiment of the present disclosure. As shown in FIG. 8, one end 351 of each of the two reinforced tubes 350 can be connected with the head tube 200 via the corresponding top tube 310.

According to the foregoing embodiments, the frame structure for bicycle of the present disclosure has the following advantages.

1. By dividing the support tube assembly into several triangular structures, the frame structure for bicycle can be strengthened and stabilized.

2. The tubes of the support tube assembly are connected to each other, so that the distribution of stress of the frame structure can be uniformized for avoiding the buckling, distortion or deformation.

3. With the mentioned frame structure, the diameter of the frame structure for bicycle can be narrowed down for reducing the production cost, and this advantage also makes the frame structure for bicycle good-looking and flexible to assemble with other parts.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A frame structure for a bicycle, comprising:
   a head tube;
   a support tube assembly comprising two top tubes, at least one down tube and two reinforced tubes, wherein one end of each of the top tubes, one end of the down tube and one end of each of the reinforced tubes are fixedly connected to the head tube respectively, an inner space being a triangular prism is formed between each of the top tubes and each of the reinforced tubes, and each of the reinforced tubes has a bended portion fixedly connected with the down tube; and
   a seat tube fixedly connected with the other end of each of the to tubes, the other end of the down tube and the other end of each of the reinforced tubes.

2. The frame structure for the bicycle of claim 1, wherein the top tubes and the reinforced tubes of the support tube assembly are symmetrically arranged respectively.

3. The frame structure for the bicycle of claim 1, wherein each of the reinforced tubes comprises at least two combinative tubes fixedly connected to each other for forming the bended portion of the reinforced tube.

4. The frame structure for the bicycle of claim 1, wherein the end of each of the reinforced tubes is connected with the lead tube via the corresponding top tube.

5. The frame structure for the bicycle of claim 1, further comprising:
   a transitive tube fixedly connected with the seat tube, and the other end of each of the two top tubes is fixedly connected with the seat tube via the transitive tube.

6. The frame structure for the bicycle of claim 1, further comprising:
   a transitive tube fixedly connected with the seat tube, and the other end of each of the two reinforced tubes is fixedly connected with the seat tube via the transitive tube.

7. The frame structure of the bicycle of claim 1, wherein a number of the down tube is two which are symmetrically arranged.

8. The frame structure for the bicycle of claim 7, further comprising:
   an intermediary tube fixedly connected with the two middle portions of the down tubes.

9. A frame structure for a bicycle, comprising:
a head tube;
two top tubes, one end of each of the top tubes fixedly connected to the head tube respectively;
two down tubes, one end of each of the down tubes fixedly connected to the head tube respectively;
two reinforced tubes, one end of each of the reinforced tubes fixedly connected to the head tube respectively, wherein an inner space being a triangular prism is formed between each of the top tubes and each of the reinforced tubes, and each reinforced tube has a bended portion fixedly connected with the corresponding down tube;
a seat tubs fixedly connected with the other end of each of the top tubes, the other end of each of the down tubes and the other end of each of the reinforced tubes; and
an intermediary tube fixedly connected with the two middle portions of the down tubes.

10. The frame structure for the bicycle of claim 9, wherein the top tubes, the down tubes and the reinforced tubes are symmetrically arranged respectively.

11. The frame structure for the bicycle of claim 9, wherein each of the reinforced tubes comprises at least two combinative tubes fixedly connected to each other for forming the bended portion of the reinforced tube.

12. The frame structure for the bicycle of claim 9, wherein the end of each of the reinforced is connected with the head tube via the corresponding top tube.

13. The frame structure for the bicycle of claim 9, further comprising:
a transitive tube fixedly connected with the seat tube, wherein the other end of each of the two top tubes is fixedly connected with the seat tube via the transitive tube.

14. The frame structure for the bicycle of claim 9, further comprising:
a transitive tube fixedly connected with the seat tube, wherein the other end of each of the two reinforced tubes is fixedly connected with the seat tube via the transitive tube.

* * * * *